3,210,437
PROCESS FOR HYDROGENATION OF
OLEFINIC HYDROCARBONS
James M. Caffrey, Jr., Wappingers Falls, N.Y., assignor to Texaco Inc., New York, N.Y., a corporation of Delaware
No Drawing. Filed Oct. 25, 1961, Ser. No. 147,476
11 Claims. (Cl. 260—683.9)

This invention relates to the hydrogenation of hydrocarbons. In its more specific aspect, this invention relates to the hydrogenation of olefins in the presence of a catalyst, and more particularly in the presence of a catalyst having been subjected to irradiation.

Catalytic hydrogenation of hydrocarbons is well known in the art, and may be carried out over a wide range of operating conditions. For example, temperatures of from about 400 to 800° F. and pressures of from about 300 to 10,000 p.s.i.g. may be used. In more recent years, conversion of various hydrocarbons has been effectively achieved by radiolysis. Thus, upon exposure of the hydrocarbon fraction to irradiation, conversion of the hydrocarbons may result, the type of conversion reaction being dependent upon the feed stock, conditions employed, catalyst, etc. Known conversion reaction by reason of radiolysis include, for example, hydrogenation, dehyrogenation, polymerization, alkylation, cracking, and so on. To the best of my knowledge, radiolysis of olefinic hydrocarbons has resulted in polymerization, irrespective of the catalyst, if any.

This invention has therefore as its purpose to provide a process for the hydrogenation of olefins in the presence of a catalyst having been subjected to irradiation. As a further advantage, the process of this invention may be conducted at moderate temperatures and pressures.

Briefly, my invention involves a process for the hydrogenation of olefins wherein the olefin in the presence of hydrogen is contacted with a molecular sieve absorbent, the adsorbent having been subjected to gamma irradiation. The molecular sieve adsorbent may be subjected to irradiation either before or after the adsorption step, an explained below in detail. The resultant product characterized by a high degree of saturation is subsequently desorbed from the molecular sieve adsorbent.

The olefinic feed stock for the process may be derived from any suitable source including a pure olefin or mixture of olefins having 2 or more carbon atoms in the molecule. A certain percentage of paraffins or naphthenes may be present in the feed stock as impurities, but preferably the impurities present should be inert to the conversion reaction. However, paraffins are adsorbed by the molecular sieve adsorbent and may effect the sieve loading with a subsequent loss in adsorption of the olefins. The feed stock, therefore, desirably contains over 50% by weight, and preferably over 75% by weight, of olefins. Although the invention is particularly adapted to the hydrogenation of 1-butene to butane, and is discussed below in detail, it should be understood that the process may be utilized for the hydrogenation of other olefins. Although olefins having as many as 20 carbon atoms per molecule may be used in the practice of my invention, the higher molecular weight materials become progressively more difficult to adsorb, and therefore the invention is particularly suited to olefins containing 2 to 10 atoms per molecule.

The molecular sieve adsorbent employed in my invention comprises certain alumino silicate adsorbents of inorganic materials in the form of porous crystals wherein the pores of the crystal are of molecular dimension and are of uniform size. A particularly suitable adsorbent is calcium alumino silicate manufactured by Linde Air Products Company and designated type 10A molecular sieve, but other molecular sieve absorbents may be used such as type 5A or type 13A. The crystals of these calcium alumino silicate materials, apparently actually a sodium calcium alumino silicate, have a pore size sufficient to admit the olefins, the pore size or diameter for type 10A, for example, being about 10 Angstrom units. Molecular sieve adsorbents with the larger pore size, especially the type 10A molecular sieve, is particularly suited for adsorption of larger molecules, and, equally important, the desorption step may be conducted more rapidly. The molecular sieve adsorbents are available in various sizes such as $\frac{1}{16}''$ or $\frac{1}{8}''$ pellets as well as finely divided powder form.

The molecular sieve adsorbent may be preconditioned or pretreated by initially exposing the adsorbent to a hydrogen atomsphere at an elevated temperature, desirably ranging from about 400 to 550° C. and for a short period of time, e.g. 15 minutes to 2 hours. The absorbent is maintained at the elevated temperature and subjected to a vacuum at a pressure substantially below 1 atmosphere and for a sufficient period of time to effectively degas the absorbent. For example, this degassing step may be effectively achieved at a temperature of from about 400 to 550° C., in a vacuum at a pressure of from about $10^{-4}$ to $10^{-5}$ mm. of mercury, and for about 1 to 20 hours. The degassed absorbent is then permitted to cool to below 100° C., and more conveniently to about room temperature. Where deemed desirable, exposure of the adsorbent material to hydrogen may be omitted from the preconditioning operation, or the adsorbent material may be degassed, then exposed to a hydrogen atomsphere and again degassed. Preconditioning of the adsorbent is particularly desirable in that more consistent results, or reproducible results, in conversion of the olefin are obtainable.

In accordance with one embodiment of my invention, the molecular sieve adsorbent, which preferably has been preconditioned, is exposed to gamma-ray exposure dose prior to contacting the olefin with the adsorbent. The adsorbent is exposed to gamma-ray dosage of usually not less than $0.1 \times 10^6$ roentgens, and preferably about $$5 \times 10^6$$

to $300 \times 10^6$ roentgens. Where deemed desirable, a higher dosage of gamma-ray exposure may be employed, but there appears to be no benefit in exceeding about $300 \times 10^6$ roentgens. Any suitable source yielding gamma irradiation may be employed such as radio-active isotopes, nuclear reactor and electron accelerator.

It was found that subjecting the molecular sieve adsorbent to high temperatures during or after irradiation will cause a decrease in catalyst activity. For this reason, during irradiation the molecular sieve adsorbent is maintained at a relatively moderate temperature, preferably below 100° C., and more conveniently at about room temperature. Irradiating at a temperature of from about 0 to 100° C. is a desirable range, and more preferably from about 5 to 40° C., and the irradiated adsorbent is maintained at this temperature for the completion of the hydrogenation reaction.

The olefinic feed stock in the presence of hydrogen is contacted with the adsorbent at a suitable temperature, and preferably in the vapor phase. For a batch operation, however, the hydrogen may be introduced to the system at any time but it is preferable to introduce the hydrogen before contacting the olefinic feed stock with the adsorbent, and where deemed desirable the hydrogen may be introduced to the system prior to irradiation. Adsorption is conducted at a temperature range between about 0° to 100° C., and preferably between about 5° to 40° C. Where temperatures higher than the described maximum are used, cracking, decomposition or other undesirable reaction may occur and further will cause a decrease in catalyst activity. Although the pressure employed is not particularly critical, pressures less than one atmosphere are desirable, but it may be more convenient and economical to conduct the process at atmospheric conditions. However, low superatmospheric pressures may be employed, for example, 5 atmospheres or more. Where deemed desirable, the olefinic feed stream upon contact with the molecular sieve adsorbent may be maintained in a liquid phase, and under high pressure. Adsorption is continued until the molecular sieve adsorbent has adsorbed a predetermined quantity of olefins, desirably about 0.5 to 50 cc. gaseous olefins at standard temperature and pressure (S.T.P. measured at 0° C. and at 1 atmosphere of pressure) per gram of adsorbent, and preferably 1 to 30 cc. olefin (S.T.P.) per gram adsorbent.

The adsorbed olefin is permitted to remain in contact with the irradiated sieve for a period of time sufficient to effect substantial hydrogenation. This reaction time is somewhat dependent on the dosage of irradiation and the amount of olefin adsorbed per gram of adsorbent. The reaction time thus may range from about 1 or 2 minutes to about 30 minutes, and preferably about 4 to 10 minutes. Generally, substantial hydrogenation of the olefin is achieved within the described limits, and although higher reaction time may increase slightly the degree of hydrogenation, this increase is not sufficient to warrant the higher reaction time.

The resulting product, characterized by a high degree of saturation, adsorbed on the molecular sieve adsorbent is desorbed or displaced therefrom by known conventional means. The adsorbate may be desorbed from the molecular sieve adsorbent, for example, by heating the adsorbent to a temperature of from about 125 to 200° C., at subatmospheric pressure. Where desired, an inert gas may be passed through the heated adsorbent material to sweep the resulting product and unreacted olefin from the adsorbent. The desorbed product, together with any unreacted olefin and other hydrocarbons, may be passed to any suitable recovery unit, such as a cooled receiver trap, to condense the desorbate. The saturated hydrocarbon product may be separated from the unreacted olefin by such conventional means as fractional distillation. The molecular sieve material may be regenerated as by heating and purging with an inert gas generally at a temperature of 150 to 250° C., and the regenerated sieve may be employed in the treatment of fresh feed stock.

Where desired, the olefinic hydrocarbon may be contacted with the adsorbent material prior to irradiation of the adsorbent. Thus, the olefin charge and hydrogen are contacted with the molecular sieve adsorbent, and the adsorbent is then subjected to the desired dosage of gamma irradiation. As a further embodiment of my invention, the adsorbent material may be irradiated prior to introducing the olefin to the system, and again after the olefin has been contacted with the adsorbent. The resultant product is desorbed from the molecular sieve adsorbent and recovered by conventional means, as explained above.

The dosage of gamma irradiation is dependent somewhat upon the amount of olefin adsorbed per gram of adsorbent, a high dosage usually being required with increased amount of olefin adsorbate. Thus, for example, for the conversion of butene using a Linde 5A molecular sieve containing 1.0 cc. gaseous butene as adsorbate and 1.0 cc. of hydrogen (S.T.P.) per gram adsorbent, a dosage of about $16 \times 10^6$ roentgens resulted in approximately 82% hydrogenation. However, when the butene as adsorbate was increased to 2.3 cc., using 2.2 cc. of hydrogen, (S.T.P.) per gram adsorbent, substantially the same dosage of gamma irradiation resulted in about 39% hydrogenation.

In each of the following examples, which further illustrate my invention, adsorption tubes were packed with a Linde molecular sieve adsorbent material. In Runs 1, 3, 4 and 8 through 10 (see table below), the packed adsorbent material was degassed by initially heating at a pressure of $10^{-5}$ mm. of mercury at 400° C. and the degassed material then cooled to room temperature. In the remaining runs (Runs 2, 5, 6 and 7), the adsorbent after degassing as above was exposed to about 0.5 cc. of hydrogen at 500° C. for one hour. The adsorbent was maintained at this temperature and then subjected to a pressure of $3 \times 10^{-4}$ mm. of mercury for 3 hours.

The adsorption tube for each run was cooled in liquid nitrogen and hydrogen introduced to the system. The adsorption tube was then brought to room temperature.

Each adsorption tube in Runs 3 through 7, 9 and 10 was subjected to irradiation for a prescribed period of time from a cobalt 60 source. The adsorption tube for these runs was cooled in liquid nitrogen to facilitate hermetic sealing and adsorption, and 1-butene in the gaseous phase was contacted with the irradiated molecular sieve adsorbent. The tube was sealed, then warmed to room temperature whereby the olefin vaporized and was adsorbed by the sieve material. The amount of olefin adsorbed by the sieve was determined for each run and the reaction time was recorded.

Control Run 2 and Run 8 differed from the preceding runs in that hydrogen and 1-butene were first contacted with the adsorbent material in the reaction tube, and the adsorption in Run 8 was then subjected to irradiation from a cobalt 60 source. Runs 9 and 10 differed from the foregoing runs in that the reaction material was twice subjected to irradiation, viz. before contacting the hydrogen and olefin with the adsorbent material and again after contact with the adsorbent material. In Runs 8, 9 and 10, reaction time is included in the irradiation step following adsorption.

The adsorbate was desorbed from the molecular sieve adsorbent by heating the adsorbent first to about 125° C. and then gradually increasing the temperature to about 200° C. over a period of about 10 to 15 minutes. The desorbed product was recovered in a cooled trap, and a sample collected for analysis by vapor phase chromatography.

Table I below summarizes the conditions and results for the numerous runs, the table showing the particular molecular sieve adsorbent used, the dosage of irradiation in Roentgens $\times 10^6$, the conditions for adsorption, time for the reaction and the percent of conversion. Control Runs 1 and 2 differed from the other runs only in that the control runs were not subjected to irradiation.

Table—Hydrogenation of butene

| Run No. | Sieve | Irradiation, R.×10⁶ | Conditions for Adsorption | | | | Reaction Time, Hrs. | Irradiation R.×10⁶ | Percent Conversion |
|---|---|---|---|---|---|---|---|---|---|
| | | | Pressure, cm. of Hg | Temp., °C. | Vol. Gas Adsorbed per gram adsorbent cc. (S.T.P.)/g. | | | | |
| | | | | | C₄ | H₂ | | | |
| 1 | 5A |  | 76 | 22.6 | 52.1 | 51.1 | 408 |  | 0 |
| 2 | 10A |  | 76 | 23 | 14.7 | 15.0 | 1 |  | 1.2 |
| 3 | 10A | 8.4 | 76 | 23 | 15.6 | 15.6 | 1 |  | 99.8 |
| 4 | 10A | 8.4 | 76 | 23 | 14.0 | 14.2 | 0.083 |  | 57.3 |
| 5 | 10A | 14.6 | 76 | 23 | 15.1 | 14.9 | 0.083 |  | 88.8 |
| 6 | 10A | 14.6 | 76 | 23 | 14.6 | 14.6 | 0.083 |  | 86.2 |
| 7 | 10A | 48.2 | 76 | 23 | 15.6 | 15.8 | 0.083 |  | 92.7 |
| 8 | 5A |  | 76 | 24.2 | 15.8 | 16.0 |  | 0.57 | 10 |
| 9 | 5A | 25.4 | 76 | 24 | 16.0 | 16.0 |  | 0.4 | 37.5 |
| 10 | 10A | 45.6 | 76 | 21 | 15.2 | 15.2 |  | 0.4 | 100 |

It will be observed from the table that irradiation of the molecular sieve adsorbent sufficiently activates the material thereby resulting in a substantial percentage of hydrogenation of the olefin. Runs 5, 6 and 7 illustrate the advantages resulting from employing a preconditioned adsorbent material whereby substantially consistent or reproducible results are obtained.

I claim:

1. A method of hydrogenating an olefin which comprises contacting said olefin in the presence of hydrogen with a molecular sieve adsorbent to adsorb said olefin, said adsorbent having been subjected to gamma irradiation of not less than $.1 \times 10^6$ roentgens, desorbing the resulting product from said molecular sieve adsorbent and recovering the hydrogenation product.

2. A method according to claim 1 wherein said molecular sieve adsorbent was subjected to gamma irradiation prior to contacting said olefin with said adsorbent.

3. A method according to claim 1 wherein said olefin is contacted with said molecular sieve adsorbent prior to subjecting said adsorbent to gamma irradiation.

4. A method according to claim 1 wherein said molecular sieve adsorbent is preconditioned before contacting said olefin with said adsorbent by exposing said adsorbent to a hydrogen atmosphere at a temperature of from about 400 to 500° C. and subsequently subjecting said adsorbent to subatmospheric pressure thereby degassing said adsorbent.

5. A method of hydrogenating an olefin which comprises contacting said olefin in the presence of hydrogen at a temperature of from 0 to 100° C. with a molecular sieve adsorbent to adsorb said olefin, said adsorbent having been subjected to irradiation of from about $0.1 \times 10^6$ to $300 \times 10^6$ roentgens, desorbing the resulting product from said molecular sieve adsorbent and recovering said resulting product.

6. A method according to claim 5 wherein said molecular sieve adsorbent was subjected to gamma irradiation prior to contacting said olefin with said adsorbent.

7. A method according to claim 5 wherein said olefin is contacted with said molecular sieve adsorbent prior to subjecting said adsorbent to gamma irradiation.

8. A method according to claim 5 wherein said molecular sieve adsorbent is preconditioned before contacting said olefin with said adsorbent by exposing said adsorbent to a hydrogen atmosphere at a temperature of from about 400 to 550° C. and subsequently subjecting said adsorbent to subatmospheric pressure thereby degassing said adsorbent.

9. A method according to claim 5 wherein said olefin is butene.

10. A method according to claim 5 wherein from about 0.5 to 50 cc. of gaseous olefin per gram of adsorbent is adsorbed by said adsorbent.

11. A method of hydrogenating butene which comprises exposing a molecular sieve adsorbent to a hydrogen atmosphere at a temperature of from about 400 to 550° C. for about 15 minutes to 2 hours, subjecting said adsorbent to subatmospheric pressure to degas said adsorbent while maintaining said adsorbent within said temperature range, subjecting said adsorbent to gamma irradiation of from about $0.1 \times 10^6$ to $300 \times 10^6$ roentgens, contacting said butene in the presence of hydrogen at a temperature of from about 0 to 100° C. with a molecular sieve adsorbent to adsorb said olefin, desorbing the resulting product from said molecular sieve adsorbent and recovering said resulting product.

References Cited by the Examiner

UNITED STATES PATENTS

| | | | |
|---|---|---|---|
| 2,905,606 | 9/59 | Long et al. | 204—154 |
| 2,959,530 | 11/60 | Long et al. | 204—154 |
| 2,967,159 | 1/61 | Gladron et al. | 252—455 |
| 3,002,910 | 10/61 | Caffrey | 204—154 |
| 3,002,911 | 10/61 | Sutherland et al. | 204—154 |
| 3,055,814 | 9/62 | Folkins | 204—154 |
| 3,058,896 | 10/62 | Nabin | 204—154 |

ALPHONSO D. SULLIVAN, *Primary Examiner*.